(12) United States Patent
Menezes

(10) Patent No.: US 8,782,770 B1
(45) Date of Patent: Jul. 15, 2014

(54) SYSTEMS AND METHODS FOR MANAGING SECURITY DURING A DIVESTITURE

(71) Applicant: Citigroup Technology, Inc., Weehawken, NJ (US)

(72) Inventor: Bromin Menezes, Old Bridge, NJ (US)

(73) Assignee: Citigroup Technology, Inc., Weehawken, NJ (US)

( * ) Notice: Subject to any disclaimer, the term of this patent is extended or adjusted under 35 U.S.C. 154(b) by 0 days.

(21) Appl. No.: 14/102,274

(22) Filed: Dec. 10, 2013

(51) Int. Cl.
*H04L 29/06* (2006.01)
*G06Q 30/02* (2012.01)

(52) U.S. Cl.
CPC ............ *H04L 63/0281* (2013.01); *H04L 63/20* (2013.01); *G06Q 30/0204* (2013.01)
USPC .......................................................... 726/12

(58) Field of Classification Search
CPC ............................ H04L 63/20; G06Q 30/0204
USPC ..................................................... 726/11–12
See application file for complete search history.

(56) References Cited

U.S. PATENT DOCUMENTS

| | | |
|---|---|---|
| 7,933,831 B2 | 4/2011 | Khoury |
| 7,945,505 B2 | 5/2011 | Van Slyke |
| 8,353,045 B2 | 1/2013 | Karabey et al. |
| 8,521,638 B1 | 8/2013 | Cross |
| 8,554,656 B2 | 10/2013 | Kotelba et al. |
| 2005/0038726 A1 | 2/2005 | Salomon et al. |
| 2009/0254474 A1 | 10/2009 | Gladstone |
| 2009/0319416 A1 | 12/2009 | Marek et al. |
| 2010/0114634 A1 | 5/2010 | Christiansen et al. |
| 2010/0185574 A1 | 7/2010 | Skatter |
| 2011/0252462 A1* | 10/2011 | Bonanno et al. ............ 726/7 |
| 2012/0124015 A1 | 5/2012 | Abrams |
| 2012/0150585 A1 | 6/2012 | Dabke |
| 2013/0117047 A1 | 5/2013 | Lyons et al. |
| 2013/0191297 A1 | 7/2013 | Levering et al. |
| 2013/0219456 A1* | 8/2013 | Sharma et al. ............. 726/1 |

FOREIGN PATENT DOCUMENTS

WO  WO 2006/047321 A2  5/2006

OTHER PUBLICATIONS

Kaillay et al., RAMeX: a prototype expert system for computer security risk analysis and management, 1995, Computers & Security, vol. 14, pp. 449-463.*
Beresnevichiene, Y. et al, "Decision Support for Systems Security Investment," Network Operations and Management Symposium Workshops (NOMS Wksps), IEEE/IFIP, Apr. 19-23, 2010, pp. 118-125.
McCrostie, P. et al., "Global Corporate Divestment Study: Maximizing Divestment Success in an Uncertain Economy," Ernst & Young Corporation, Abstract, 2013, EYG No. DE0379, pp. 1-24.
ip.com et al., "A System and Method for Identifying and Managing Internet Usage and Linking with Enterprise-Specified Business Rules", IPCOM000219157D, Jun. 23, 2013, pp. 1-5.

* cited by examiner

*Primary Examiner* — Pramila Parthasarathy
*Assistant Examiner* — Dao Ho
(74) *Attorney, Agent, or Firm* — John M. Harrington, Esq.; Johnson, Marcou & Isaacs, LLC

(57) ABSTRACT

Methods and systems for managing security during a divestiture may involve, for example, differentiating divested assets and employees from non-divested assets and employees and identifying non-divested assets which divested employees are permitted to access. In addition, divested employee access to the non-divested assets which divested employees are not permitted to access is locked down, and a separation firewall is deployed between divested networks and non-divested networks.

19 Claims, 8 Drawing Sheets

SYSTEMS AND METHODS FOR MANAGING SECURITY DURING A DIVESTITURE

FIELD OF THE INVENTION

The present invention relates generally to the field of information technology (IT) security, and more particularly to systems and methods for securely separating IT assets and personnel of an entity that is divesting some of such assets and personnel from those of an entity that is acquiring the divested assets and personnel.

BACKGROUND OF THE INVENTION

A divestiture may involve the sale of part of the assets of a divesting company to a buyer. A divestiture, for example, of less than all of the assets of a selling entity to a buying entity, such as a buying company, requires a quick transition of the divested assets to the buying entity. Generally, such assets may include IT and intellectual property (IP) assets, data, and various systems that may have been accumulated in the divesting company and become commingled internally over many years. Typically, such a transaction may include a transition services agreement (TSA) that becomes effective after the transaction closes. The TSA may be defined as a contractual agreement that formally documents the duration of a transition period and the services that are to be provided by the divesting entity to the buying entity as part of that agreement.

The closing may be followed by what may be characterized as legal day one (LD1), on and after which the buying entity officially owns the divested assets. The TSA may be effective from LD1, which may be the day after the close of the sale. Nevertheless, the divested assets may still be under the management control of the divesting entity after LD1. Under the terms of the transaction and the TSA, the buying entity and the divesting entity may agree on a period of time for the transition to be completed, which may extend over a period ranging from one month or less to several months or years.

A divestiture may include, for example, personnel, branches, network infrastructure, desktops, applications, intellectual property, servers, applications, and/or telephones. In the divestiture, the TSA is likely to be the only governing document for protecting the selling entity if there is a loss or compromise of confidential data either accidently or deliberately. Reliance solely on the TSA means that any actions taken must be taken after the fact and without the benefit of systematic proactive steps to reduce the likelihood of data leakage or data compromise. Such data leakage or compromise may involve, for example, loss or compromise of different categories of data, such as, public information, internal information, confidential information or personally identifiable information (PII).

In a typical divestiture, there is a direct conflict of interest between the buying entity and the selling entity. Once the assets are paid for, the buyer may wish to have immediate control of the newly acquired assets. However, the seller may want to protect itself because it may have core data and intellectual property that was not sold and is not part of the divestiture. Thus, the selling entity may want to ensure that the buyer is not able to access core data and intellectual property that the seller still owns. Therefore, the seller desires to complete the transition securely and minimize avenues for accidental or deliberate data losses. In an ideal world, all divested assets would be separated before LD1, but that is not often possible.

Although the buyer may own the divested IT assets following LD1, management of the divested assets may still need to be under the divesting entity's control. In most cases, since the divested assets, particularly IT assets, are co-mingled with non-divested assets, handover and transition of the divested assets is complicated due to inherent conflicts of interests. Since the divested IT assets are co-mingled with non-divested IT assets within the entity, there is a current need for a systematic and controlled method for transitioning, separating and migrating the divested assets.

Another issue in a divestiture may be the identification of divested personnel during the transition phase. For example, clients, vendors, or others who deal with the divesting entity may not be aware that certain persons have been divested and may unknowingly provide confidential information meant for the divesting company to divested personnel. There is a present need for the divesting company to protect its assets, and also for the buyer to be able to take possession of the assets as quickly as possible. There is a further need for methods and systems to separate the IT assets, including the people, between the divesting entity and the buying entity. There is still a further need for methods, designs and processes that utilize multiple layers of security controls that work together to reduce data leakage by divested workers during and after a divestiture.

SUMMARY OF THE INVENTION

Embodiments of the invention employ computer hardware and software, including, without limitation, one or more processors coupled to memory and non-transitory, computer-readable storage media with one or more executable computer application programs stored thereon which instruct the processors to perform the methods and systems for managing security during divestiture of assets and employees described herein. Embodiments of the invention provide methods and systems for managing security during the divestiture of assets and employees by a divesting entity that may involve, for example, differentiating divested assets and employees from non-divested assets and employees; identifying non-divested assets which divested employees are permitted to access; locking down divested employee access to the non-divested assets which divested employees are not permitted to access; and deploying a separation firewall between divested networks and non-divested networks.

In aspects of embodiments of the invention, differentiating the divested employees may involve, for example, changing status of divested employees from employees of the divesting entity to non-employees of the divesting entity. In other aspects, changing the status of divested employees may involve, for example entering the change on a human resources database of the divesting entity. In further aspects, differentiating the divested employees may involve, for example, tagging emails of divested employees. In additional aspects, tagging the emails of divested employees may involve, for example, entering email tagging logic on a global address database of the divesting entity. In still other aspects, differentiating the divested employees may involve, for example, providing email disclaimers for divested employees. In further aspects, providing the email disclaimers for divested employees may involve, for example, entering email disclaimer logic on a global address database of the divesting entity. In still further aspects, differentiating the divested employees may involve, for example, grouping divested employees into an active directory group of divested employees on a human resources database of the divesting entity.

In additional aspects of embodiments of the invention, identifying the non-divested assets which divested employees are permitted to access may involve, for example, generating a whitelist of non-divested assets which the divested employees are permitted to access. In further aspects, generating the whitelist of non-divested assets may involve, for example, generating a whitelist of intranet sites of the divesting entity which the divested employees are permitted to access. In other aspects locking down divested employee access to the non-divested assets, may involve, for example, deploying a divestiture proxy server between divested employees and non-divested assets. In still other aspects, locking down the divested employee access to the non-divested assets may involve, for example, logging divested employee access via the divestiture proxy server to non-divested assets. In still further aspects, locking down the divested employee access to the non-divested assets may involve, for example, deploying a whitelist filter on the divestiture proxy of non-divested assets which the divested employees are permitted to access. In still other aspects, locking down divested employee access to the non-divested assets may involve, for example, grouping divested employees into a remote access service group separate from a non-divested employees remote access service group.

In other aspects of embodiments of the invention, deploying the separation firewall may involve, for example, providing temporary connectivity during a first predetermined period between the divested networks and the non-divested networks via the separation firewall. In additional aspects, providing temporary connectivity during the first predetermined period may involve, for example, logging traffic between the divested networks and the non-divested networks during the first predetermined period via a separation firewall access logger. In further aspects, deploying the separation firewall may involve, for example, providing temporary connectivity during a second predetermined period between buying entity networks and the non-divested networks via the separation firewall. In still other aspects, providing temporary connectivity during the second predetermined period may involve, for example, logging traffic between the buying entity networks and the non-divested networks during the second predetermined period via the separation firewall access logger. In still further aspects, providing temporary connectivity during the first predetermined period may involve, for example, terminating connectivity between the divested networks and the non-divested networks via the separation firewall upon expiration of the first predetermined period. In additional aspects, providing temporary connectivity during the second predetermined period may involve, for example, terminating connectivity between the buying entity networks and the non-divested networks via the separation firewall upon expiration of the second predetermined period.

These and other aspects of the invention will be set forth in part in the description which follows and in part will become more apparent to those skilled in the art upon examination of the following or may be learned from practice of the invention. It is intended that all such aspects are to be included within this description, are to be within the scope of the present invention, and are to be protected by the accompanying claims.

DETAILED DESCRIPTION

Reference will now be made in detail to embodiments of the invention, one or more examples of which are illustrated in the accompanying drawings. Each example is provided by way of explanation of the invention, not as a limitation of the invention. It will be apparent to those skilled in the art that various modifications and variations can be made in the present invention without departing from the scope or spirit of the invention. For example, features illustrated or described as part of one embodiment can be used in another embodiment to yield a still further embodiment. Thus, it is intended that the present invention cover such modifications and variations that come within the scope of the invention.

Embodiments of the invention utilize one or more special purpose computer software application program processes, each of which is tangibly embodied in a physical storage device executable on one or more physical computer hardware machines, and each of which is executing on one or more of the physical computer hardware machines (each, a "computer program software application process"). Physical computer hardware machines employed in embodiments of the invention comprise, for example, input/output devices, motherboards, processors, logic circuits, memory, data storage, hard drives, network connections, monitors, and power supplies. Such physical computer hardware machines include, for example, user machines and server machines that may be coupled to one another via a network, such as a local area network, a wide area network, or a global network through telecommunications channels which may include wired or wireless devices and systems.

Embodiments of the invention provide a an organized, consistent and systematic methodology for securely separating divested IT assets and personnel of an entity that is divesting some of such assets and personnel from those of an entity that is acquiring the divested assets and personnel. Further, embodiments of the invention provide a repeatable framework for reducing information security (IS) risks to a divesting company using multiple layers of security controls, processes, deployment methods and security infrastructure to help reduce data leakage and IS risks.

Figure 1:
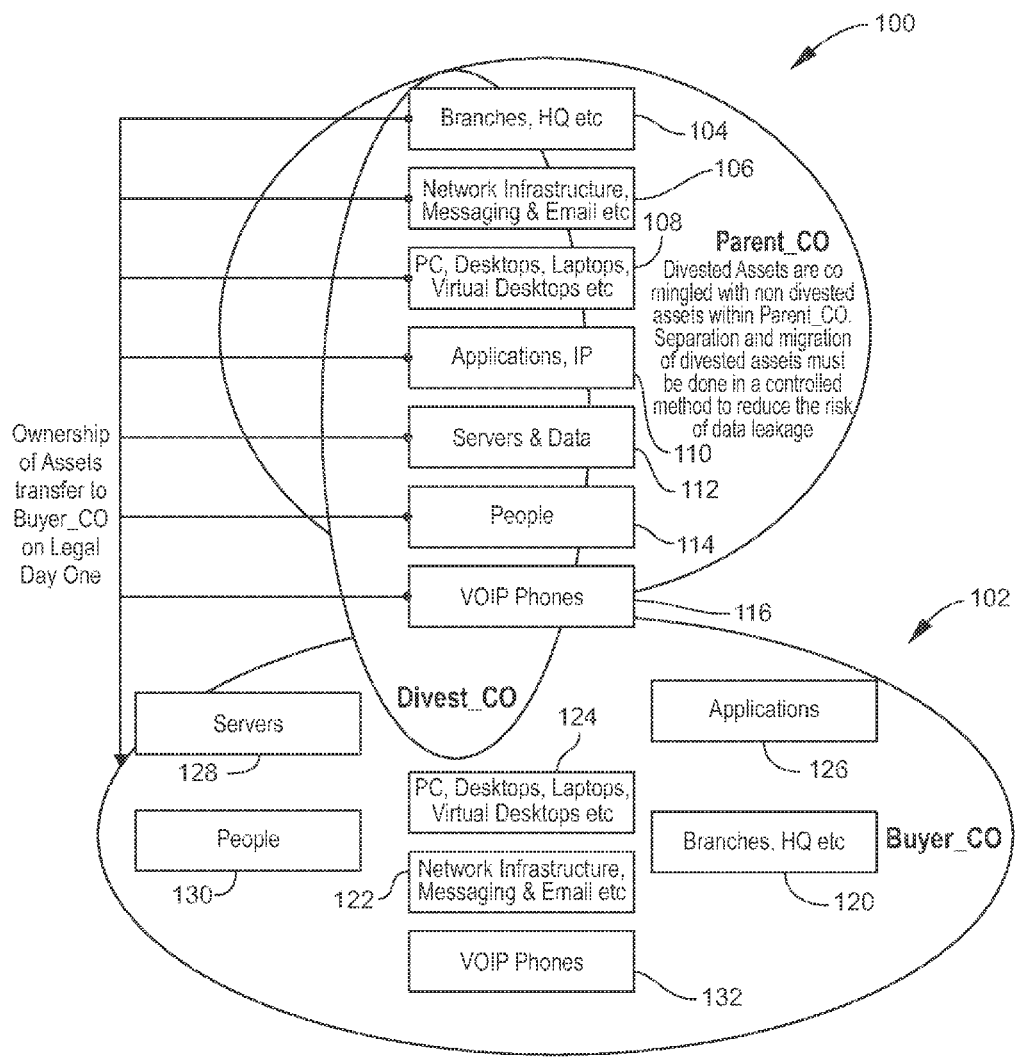
FIG. 1 is a schematic diagram that illustrates an example of an initial state of divested assets of a divesting entity at a time, for example, when a divestiture may be announced according to embodiments of the invention.

FIG. 1 is a schematic diagram that illustrates an example of an initial state of divested assets of a divesting entity at a time, for example, when a divestiture may be announced according to embodiments of the invention. Referring to FIG. 1, a divestiture may involve, for example, sale of assets by a divesting entity 100 to a buying entity 102, which may be a completely separate legal entity from the divesting entity or a spin-off of the divesting entity. The divested assets may include, for example, branches or headquarters 104; network infrastructure, messaging, and email 106; PCs, desktops, laptops, and virtual desktops 108; applications and IP 110; servers and data 112; people 114; and VOIP phones 116. It is to be understood that the foregoing is an example only and that the divested assets may include any number of other types of assets of the divesting entity.

Referring further to FIG. 1, the divested assets may be owned from LD1 forward by the buying entity 102, which may wish to integrate the divested assets with its own assets. Such assets of the buyer with which the buyer may wish to integrate the divested assets may likewise include, for example, branches or headquarters 120; network infrastructure, messaging, and email 122; PCs, desktops, laptops, and virtual desktops 124; applications and IP 126; servers and data 128; people 130; and VOIP phones 132. It is likewise to be understood that the foregoing is an example only and that the assets of the buying entity with which the buyer may want to integrate the divested assets may also include any number of other types of assets of the buying entity.

Figure 2:
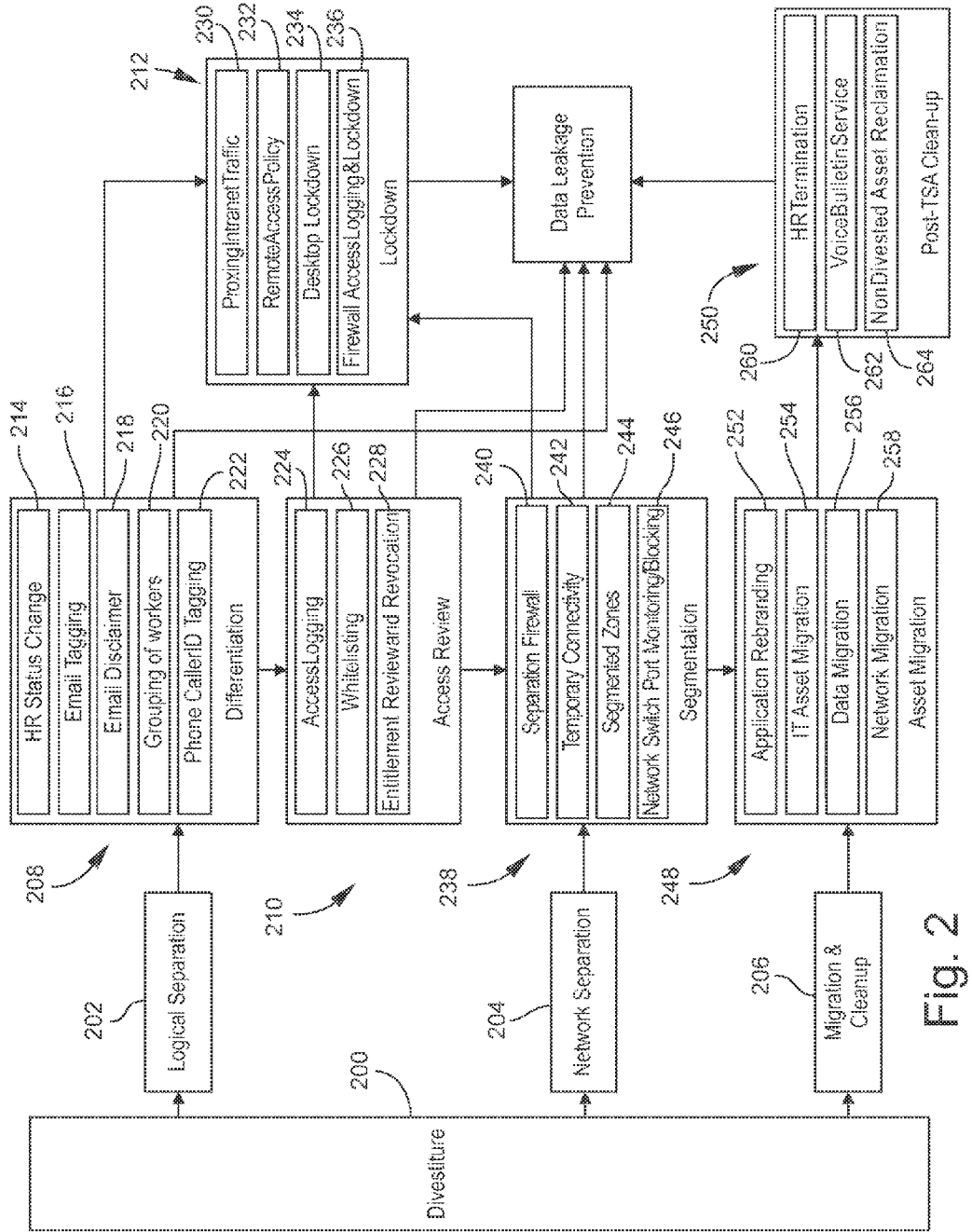
FIG. 2 is a schematic diagram that illustrates an overview example of a methodology, architecture and model for applying specific controls at different layers to reduce a risk of data leakage for embodiments of the invention.

FIG. 2 is a schematic diagram that illustrates an overview example of a methodology, architecture and model for applying specific controls at different layers to reduce a risk of data leakage for embodiments of the invention. Referring to FIG. 2, significant processes in completing a divestiture 200 and reducing chances for data leakage for embodiments of the invention may include, for example, logical separation 202, network separation 204, and migration and cleanup 206.

Referring further to FIG. 2, logical separation 202 may refer to differentiating divested assets from non-divested assets and controlling access to all non-divested assets. Thus, logical separation 202 may in turn be broken into sub-categories of differentiation 208, access review 210, and lockdown 212, each of which is performed during the TSA period. Differentiation 208 may involve, for example, human resources (HR) status change 214, email tagging 216, email disclaimer 218, grouping of workers 220, and phone caller ID tagging 222. Access review 210 may involve, for example, access logging 224, whitelisting 226, and entitlement review and revocation 228. Lockdown 212 may involve, for example, proxying intranet traffic 230, remote access policy 232, desktop lockdown 234, and firewall access logging and lockdown 236.

It is to be noted that in the desktop lockdown 234 aspect, a package with a list of appropriate controls may be applied to every physical desktop, laptop or virtual desktop that an employee uses irrespective if the physical desktop, laptop or virtual desktop is divested or not. It is to further noted that lockdown of employees may happen on divested assets as well as non-divested assets where divested employees' access to non-divested access is controlled. For example, the lockdown package may be applied to the divested laptop of a divested employee during the TSA period. Thus, during the TSA period, the particular divested employee's access to all applications may be restricted. Once the operational management of the divested laptop is handed over to the buying entity, the lockdown packages are removed.

Referring again to FIG. 2, network separation 204 may involve, for example, segmentation 238, such as separation firewall 240, temporary connectivity 242, segmented zones 244, and network switch port monitoring and/or blocking 246. In addition, migration and cleanup 206 may in turn be broken into sub-categories of asset migration 248 and post-TSA cleanup 250. Asset migration 248 may involve, for example, application rebranding 252, IT asset migration 254, data migration 256, and network migration 258. Post-TSA cleanup 250 may involve, for example, HR termination 260, voice bulletin service 262, and non-divested asset reclamation 264.

Figure 3:
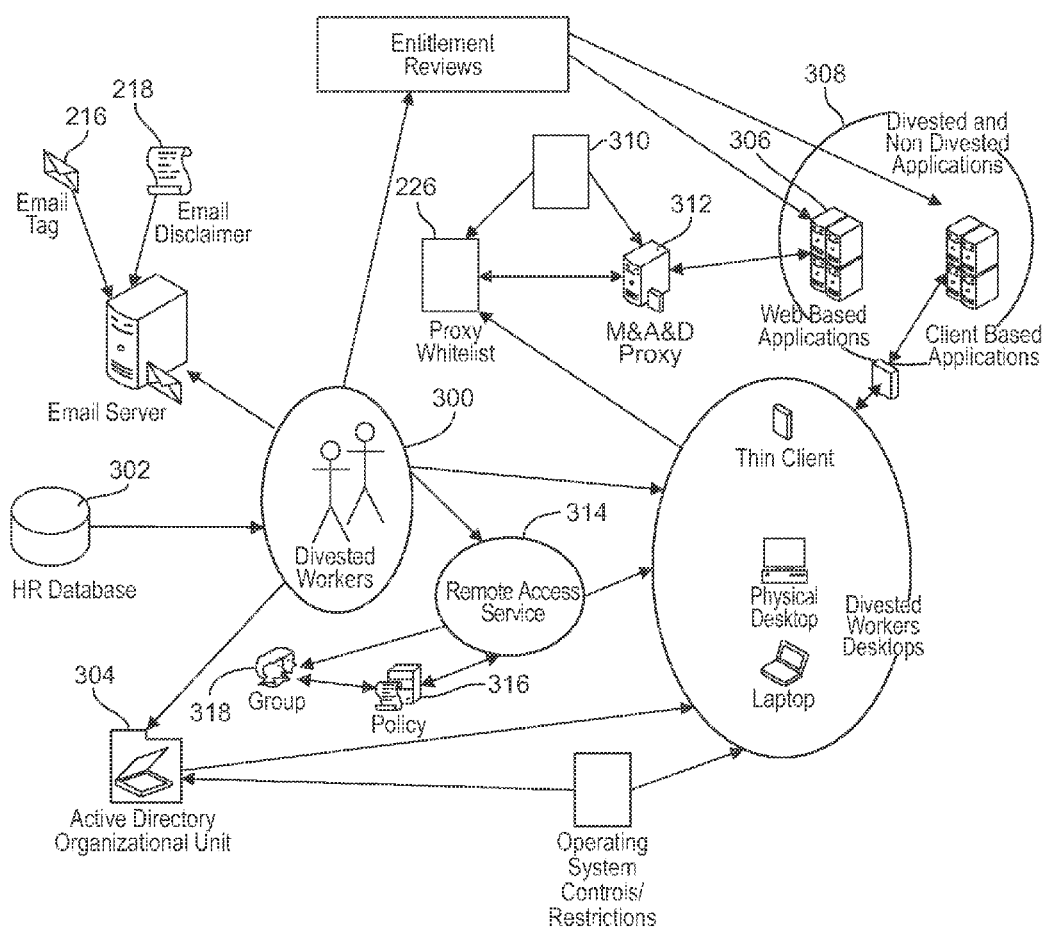
FIG. 3 is a diagrammatic flow chart that illustrates an example overview of interactions and ties between different components of a divesting entity during logical separation for embodiments of the invention.

FIG. 3 is a diagrammatic flow chart that illustrates an example overview of interactions and ties between different components of a divesting entity during logical separation 202 as shown in FIG. 2 for embodiments of the invention. Referring to FIGS. 2 and 3, the differentiation aspect 208 of logical separation 202 for embodiments of the invention may refer, for example, to all activities required to clearly draw a boundary around the divested assets to allow other people and systems to be aware of the change in ownership of the divested assets. For example, on LD1, an HR status of all divested workers 300 may be changed 214 in an HR database 302 of the divesting entity from an "employee" to a "non-employee" status. Such a change in status in the HR database 302 may assure that applications obtaining an HR feed are aware of the employee status change and allow automated de-provisioning of certain employee entitlements and privileges.

Referring further to FIGS. 2 and 3, email tagging 216 and email disclaimer 218 for embodiments of the invention may alert internal senders and both internal and external recipients that certain workers have been divested and are now non-employees of the divesting company. Such an alert may allow such senders and/or recipients to judge whether or not a particular email message communication is appropriate. Such email tagging 216 may be used to quickly identify a change in the status of divested workers 300 in a global address list (GAL). A naming convention of the email tagging aspect 216 for embodiments of the invention may alert a sender of an email that the intended recipient has been divested. For example, a notation such as "DIV" may be used to indicate that an employee has been divested; the buying entity may be identified as "ABC"; and the notation, "NE", may be used to indicate that the divested employee 300 is now a non-employee. Thus, someone, such as an employee of the divesting entity, who intends to send an email to a divested worker 300 may see the divested worker identified, for example, as "Doe, John [DIV-ABC_NE]" instead of "Doe, John [CCC-OT_IT]" as he or she may have been previously identified. It is to be understood that the above is exemplary only and that embodiments of the invention may employ any other suitable naming convention.

Referring again to FIGS. 2 and 3, an email disclaimer 218 may be used when divested workers 300 continue to use the divesting entity's email system after LD1. Thus, each time a divested worker 300 sends an email using the divesting entity's email system, an email disclaimer 218 may alert the recipient of an email from the divested worker that the sender now works for the buying entity. Such an email disclaimer 218 may ensure that email recipients are aware that they are now dealing with an employee of an entity other than the divesting entity.

In addition, all divested workers 300 may be included in a grouping of workers 220 and grouped into a logical representation, such as an active directory organizational unit 304 on a human resources database 302 of the divesting entity. Such grouping of workers 220 may enable the divesting company to quickly apply specific controls at a top layer that may be cascaded down only to the divested workers 300. Further, the caller ID function on telephones of divested workers 300 may be tagged 222 with the information identifying such workers as employees of the buying entity. Such caller ID tagging 222 also serves as a method of alerting recipients of telephone calls from divested workers 300 that the caller now works for a different company.

Referring once again to FIGS. 2 and 3, in the access review aspect 210 of logical separation 202 for embodiments of the invention, access of divested workers to applications may be reviewed through an entitlement review and revocation process 228 to confirm whether or not divested workers have an appropriate level of access for updated job functions. Any excessive entitlements that are identified during this process may be revoked. Entitlement review and revocation 228 may have direct impact on the both web-based applications 306 and client-based applications 308. In addition, a proxy log review 310 may be used to build a proxy whitelist 226 as shown in FIG. 2 that may explicitly provide for allowance of entry to the front door of specific websites. Referring still again to FIGS. 2 and 3, it is to be noted that access logging 224 and whitelisting 226 may be performed in connection with proxying intranet traffic 230 of the lockdown aspect 212 and separation firewall 240 of the segmentation aspect 238 discussed hereinafter in greater detail.

Referring also to FIGS. 2 and 3, in the lockdown aspect 212 of logical separation 202 for embodiments of the invention, proxy servers 312 may control access to Internet and intranet resources (e.g., web-based applications). A proxy instance may be created specifically for divested workers 300. If an entity is divesting more than one business at a time, each divestiture may have its own proxy instance. Divested staff 300 may be migrated to separate proxy instances with a customized auto-proxy configuration (PAC) file. The PAC file may be served to divested staff 300 via a directed proxy instance. A "whitelist" filter on the proxy may ensure that only specific pre-approved internal sites of the divesting entity are accessible. Generally, all internal or intranet sites may be available to all workers within the firm. Specifically the proxy may be configured to forward all Internet-related traffic to corporate web proxies and internally for any specific intranet site. No Internet access may be allowed, for example, from a desktop that is managed by a third party directly through divesting company proxies.

Typically, a divesting entity may have a remote access service 314 that allows its workers to access IT resources via the Internet from virtually any location. Accordingly, during a divestiture, there is an extremely high risk of data leaving the divesting entity to an unknown location on the Internet. In order to reduce such a threat, referring to FIG. 3, divested workers 300 may be grouped in a separate remote access service group 318 that is configured under a policy 316 to allow only remote desktop capabilities. Thus, the ability of divested workers 300 to send files to an unmanaged desktop is blocked as all VPN capabilities are removed. Upon completion of the TSA, the access for divested workers 300 is terminated.

Typically, all desktops, including virtual desktops, physical PC's and laptops, may have a capability to leak data through the use of removable media such as USB devices and CDROMs. Further, workers may typically have an ability to override certain settings that allow them to bypass controls and potentially gain access to applications beyond roles that are implemented. However, it may be appreciated that divested workers 300 using devices managed by the divesting entity may need to connect outbound to virtual hosts that reside and are managed by the divesting entity. Therefore, embodiments of the invention may implement controls to block drive-mapping and clipboard-sharing that may be enabled by a third party. According to embodiments of the invention, the divesting entity may implement specific desktop-related configuration packages that disable the use of removable media, prohibit the changing of any settings, and prevent any outbound data leakage. Such packages may then be deployed through all workers in the same divested group 318. These configurations packages may lock the divested workers to only applications and hosts to which the divested workers are entitled in connection with their specific job functions.

Figure 4:
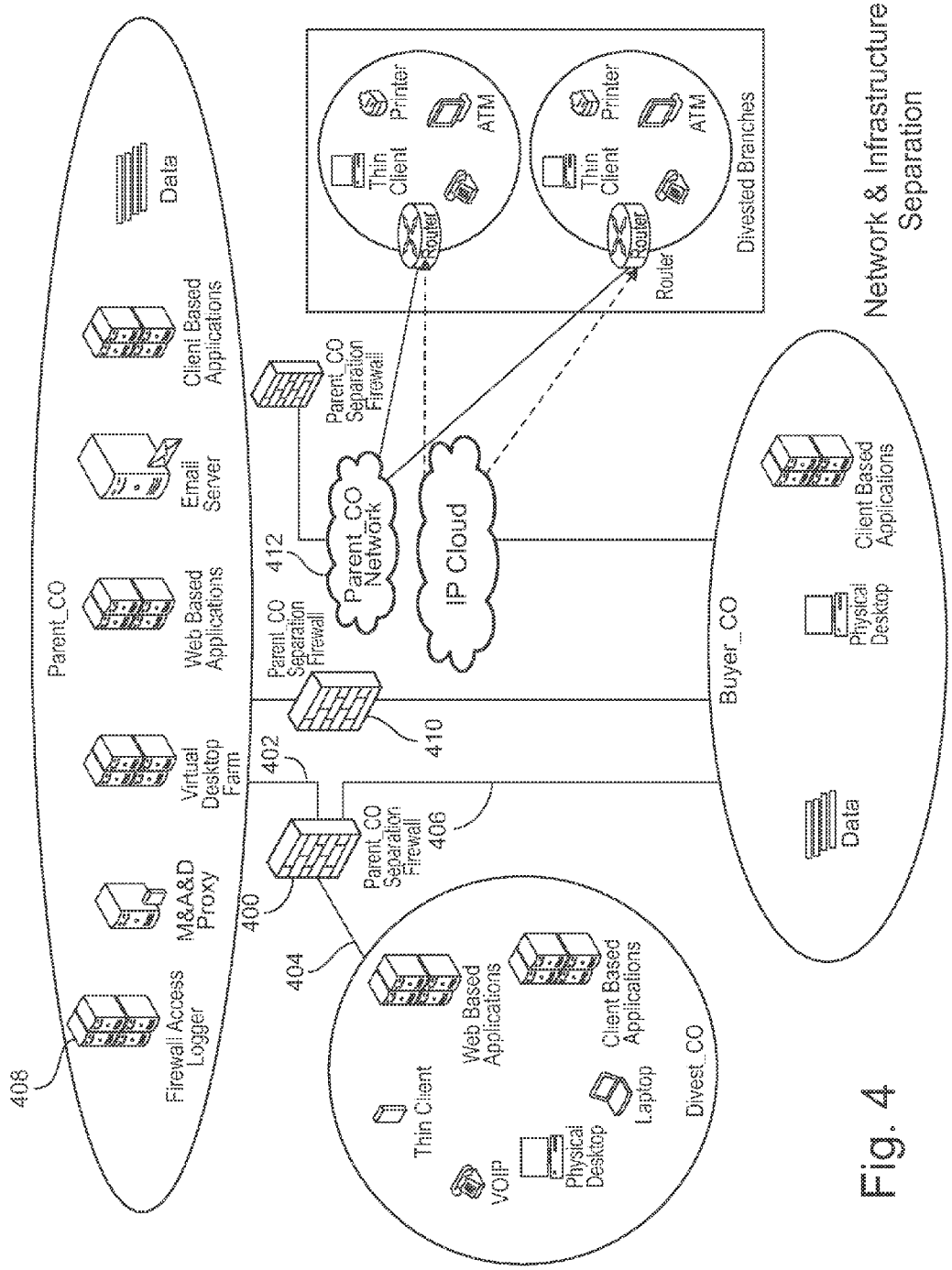
FIG. 4 is a schematic flow diagram that illustrates an example of network and infrastructure separation for embodiments of the invention.

Referring once more to FIGS. 2 and 3, in the segmentation aspect 238 of network separation 204 for embodiments of the invention, one or more separation firewalls 240 may be deployed between divested IT infrastructures and the divesting entity's infrastructures. FIG. 4 is a schematic flow diagram that illustrates an example of network and infrastructure separation for embodiments of the invention. Referring to FIG. 4, one or more separation firewalls 400 may be added between the divesting entity and the buying entity. The one or more firewalls 400 illustrated in FIG. 4 are shown only as examples to explain an overall setup for embodiments of the invention. In actual implementation, there may be multiple firewalls that are load-balanced against one another, for example, to provide failover. The separation firewalls 400 are always managed by the divesting entity.

In the example shown in FIG. 4, firewall connections 402, 404, and 406 may be built in such a way as to support segmentation 238 among the different networks. For example, traffic via connection 404 may be allowed into connection 402 and vice versa. Likewise, traffic via connection 406 may be allowed into connection 404 and vice versa. However, traffic via connection 402 may not be allowed to connections 406 and vice versa. Connection 406 may be coupled to the buying entity's network; connection 404 may be coupled to the divesting entity's network; and connection 402 may be coupled to the divested network. Such a configuration may allow the divested network to communicate only with the networks of the divesting entity and the buying entity. Network routing between connections 402, 404, and 406 may be configured such that connection 402 may not accept any data packets routed from connection 406, and such packets may instead be discarded.

In embodiments of the invention, temporary connectivity for the divestiture may be established through use of the separation firewalls, such as via connection 406. It is understood that there may be existing network connectivity between the buying entity and divesting entity as a result of previous business between them. Such connectivity may be kept separate so as to not impact the cleanup activities 206 shown in FIG. 2, which may occur at a later time. In a typical divestiture, a buying entity may want full access to the divested network, while at the same time, the divesting entity needs to ensure that the buying entity is allowed to access only the divested network without having any access directly into the divesting entity's network. To address such concerns by embodiments of the invention, during transition, certain firewall rules may be implemented over time, for example, between connections 402, 404, and 406. One such rule may provide that during an early part of the TSA, the rules between connections 402 and 404 may be open, and the divesting entity may use a firewall access logger 408 as shown in FIG. 4 to log the traffic between connections 402 and 404. Another such rule may be that rules are nonexistent between connections 404 and 406, and that connection 406 is unable to communicate with connection 402, which means that there is no communication between the buying entity's network and the divesting entity's network.

A further such rule may be that based upon logged traffic, the divesting entity may implement specific rules between connections 404 and 406, following which limited low IS risk traffic may be allowed between connections 404 and 406. The firewall rules may be logged, reviewed and locked down 236 in the lockdown aspect 212 as illustrated in FIG. 2. The divesting entity may then continue to assure that traffic from the divested network over connection 404 to the divesting entity network over connection 402 is more restrictive. As the divesting entity is retreating from the divested network, the divesting entity may open higher risk traffic between connections 404 and 406. In embodiments of the invention, when the buying entity wishes to communication with the divesting entity during transition, it may do so through a completely different set of firewalls 410 as shown in FIG. 4 and with a completely different set of policy enforcements. Embodiments of the invention may achieve this situation only by implementing segmentation, different sets of firewalls and firewall policies, and routing. Further such arrangements may also allow the divesting entity and the buying entity to do business beyond the divestiture period.

Figure 5:
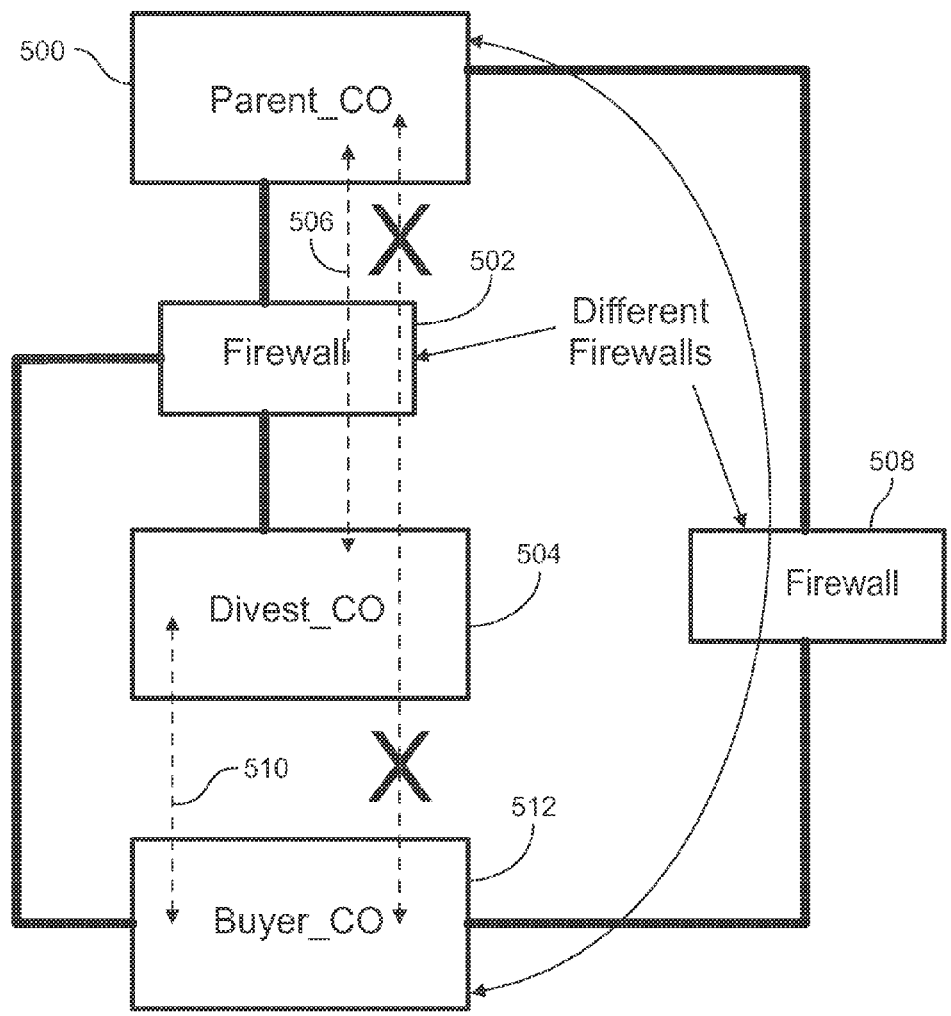
FIG. 5 is a schematic diagram that illustrates an example of a firewall arrangement for embodiments of the invention.

FIG. 5 is a schematic diagram that illustrates an example of a firewall arrangement for embodiments of the invention. Referring to FIG. 5, in embodiments of the invention, the divesting entity 500 may install a separation firewall 502 between the divested network 504 and itself through which network traffic 506 between the divesting entity 500 and the divested network 504 may be allowed to pass. The divesting entity 500 may manage firewalls 502 and 508 at all times. Upon successful logging and lockdown of firewall 502, the divested network 504 may be coupled via connection 510 to the buying entity 512, which may communicate only with the divested network 504.

Figure 6:
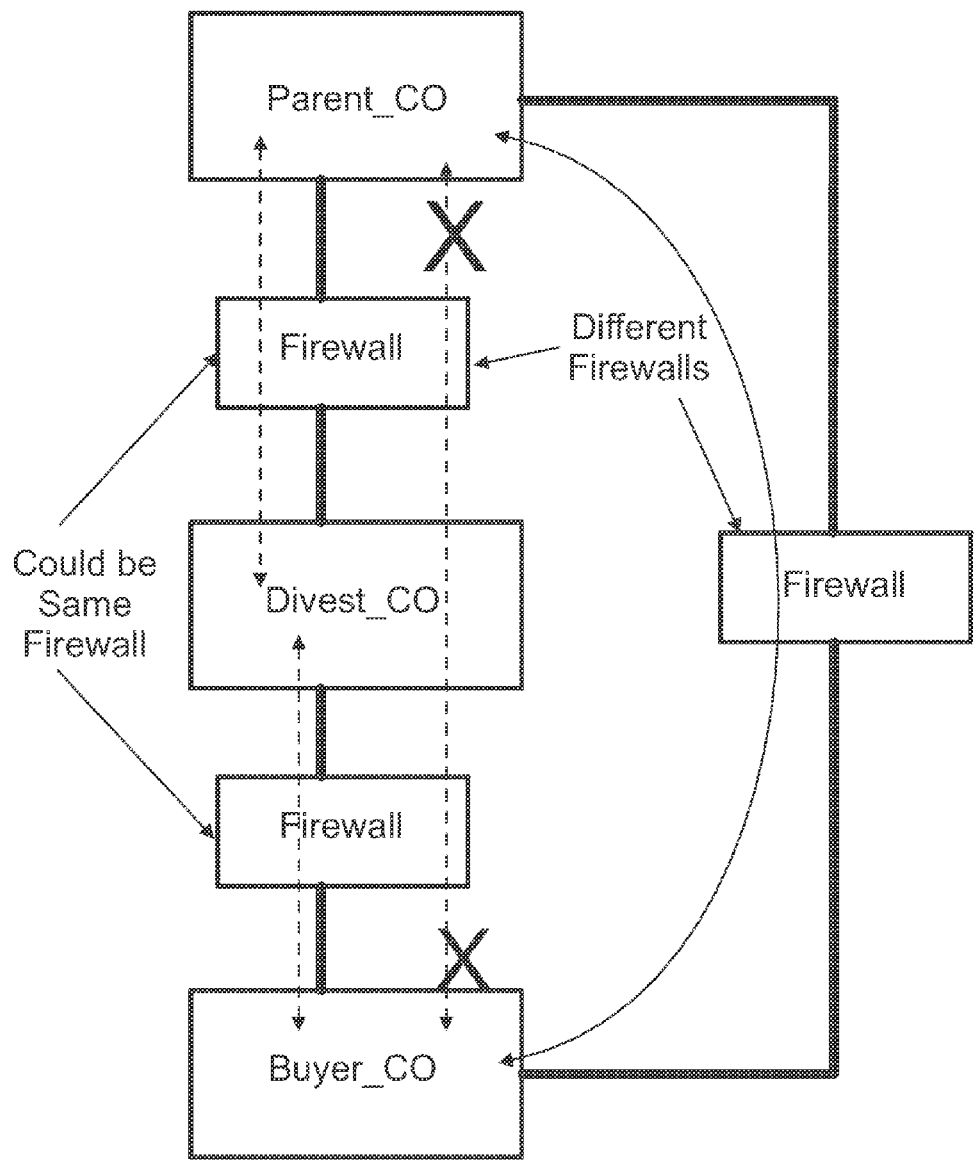
FIG. 6 is a schematic diagram that illustrates an example of an alternative firewall arrangement for embodiments of the invention that employs a model similar to the firewall arrangement of FIG. 5.

Referring further to FIG. 5, the divesting entity 500 and the buying entity 512 may not communicate with one another via firewall 502 but may communicate with one another via firewall 508 which may operate on a stricter security policy than firewall 502. Firewall 502 may initially have an open policy between the divesting entity 500 and the divested network 504 and a stricter policy between the divested network 504 and the buying entity 512. As the TSA period draws to an end, a stricter policy may be implemented between the divesting entity 500 and the divested network 504, and a much more lenient policy may be implemented between the buying entity 512 and the divested network 504. FIG. 6 is a schematic diagram that illustrates an example of an alternative firewall arrangement for embodiments of the invention that employs a model similar to the firewall arrangement of FIG. 5.

Figure 7:
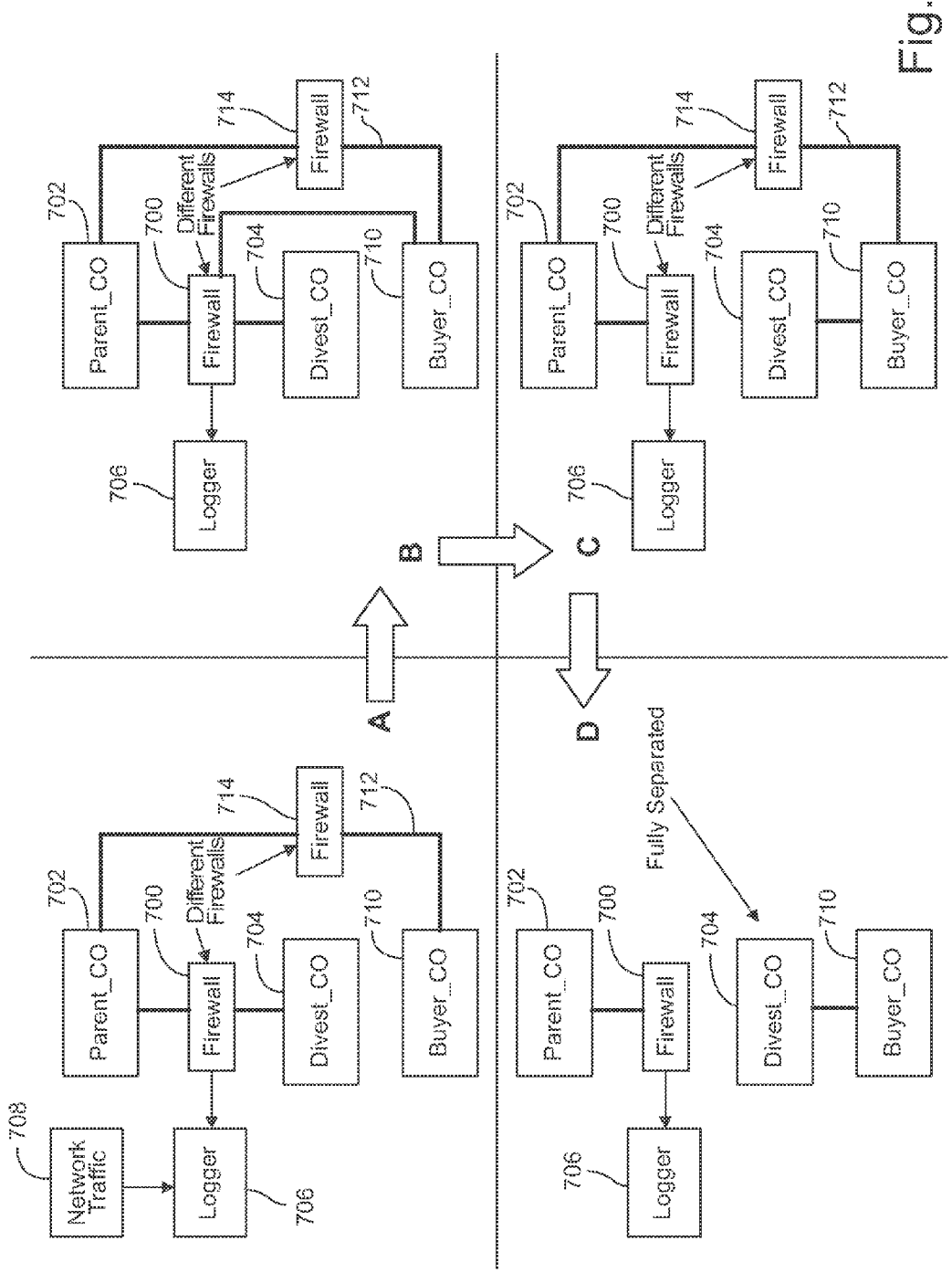
FIG. 7 is a schematic diagram that illustrates an example of a transition of firewalls over the course of a TSA and concluding with full separation for embodiments of the invention.

FIG. 7 is a schematic diagram that illustrates an example of a transition of firewalls over the course of a TSA and concluding with full separation for embodiments of the invention. Referring to FIG. 7, a separation firewall 700 may be installed between the divesting entity 702 and the divested network 704 and may always be managed by the divesting entity 702. The firewall 700 may by in a logging-only mode with nothing blocked. All traffic may be logged and sent to a firewall logger 706 that correlates and consolidates the logs to help build the firewall rules that are required. Network traffic 708 may also be logged to the logger 706 to help build the initial firewall rules. Since the divested infrastructure was formerly a part of the divesting entity 702, there was originally full access from the divested infrastructure 704 into the core network of the divesting entity 702. At an initial stage A as shown in FIG. 7, the buying entity 710 may not have full access to the divested infrastructure 704 but may have access to the divesting entity 702 through an original connectivity 712 and firewall 714, albeit primarily to access IT assets within the divesting entity 702.

Referring to FIG. 7, at a later stage B, the firewall 700 may locked down with the help of rules developed using the logger 706. Once firewall 700 is locked down, the buying entity 710 may be given access to the divested network 704 through the separation firewall 700. The buying entity's access to the divested infrastructure 704 may be restricted initially and gradually allowed as traffic becomes restricted between the divesting entity 702 and the divested infrastructure 704. At a still later stage C, the link between the divested infrastructure 704 and the divesting entity 702 may be disconnected, and the buying entity 710 may assume all control of the divested infrastructure 704. At that point, any network connection between the divesting entity 702 and the divested infrastructure 704 may occur over the firewall 714. At a final stage D, the divested infrastructure 704 may be fully separated from the divesting entity 702.

It is recognized that at some point, there may be dual connectivity, for example, between a divested branch or other divested location to the buying entity's network, as well the divested network. In that case, referring to FIG. 2, the switch port monitoring and blocking aspect of network separation may be implemented. In such implementation, the network switch ports may be configured to only allow network devices related to the divesting entity or the divested infrastructure on the network. Such implementation may prevent any accidental or deliberate attempts to connect devices other than divesting entity devices to the divesting entity network or the buying entity network. The implementation may also prevent entry of malware from a non-managed desktop on the divesting entity's network. The foregoing model for embodiments of the invention maintains separation of the networks of the divesting entity 702, the divested infrastructure 704, and the buying entity 710, thereby reducing risk to the divesting and buying entities, while allowing the buying entity to gain access to the divested infrastructure at a much faster pace than in currently available methods.

Figure 8:
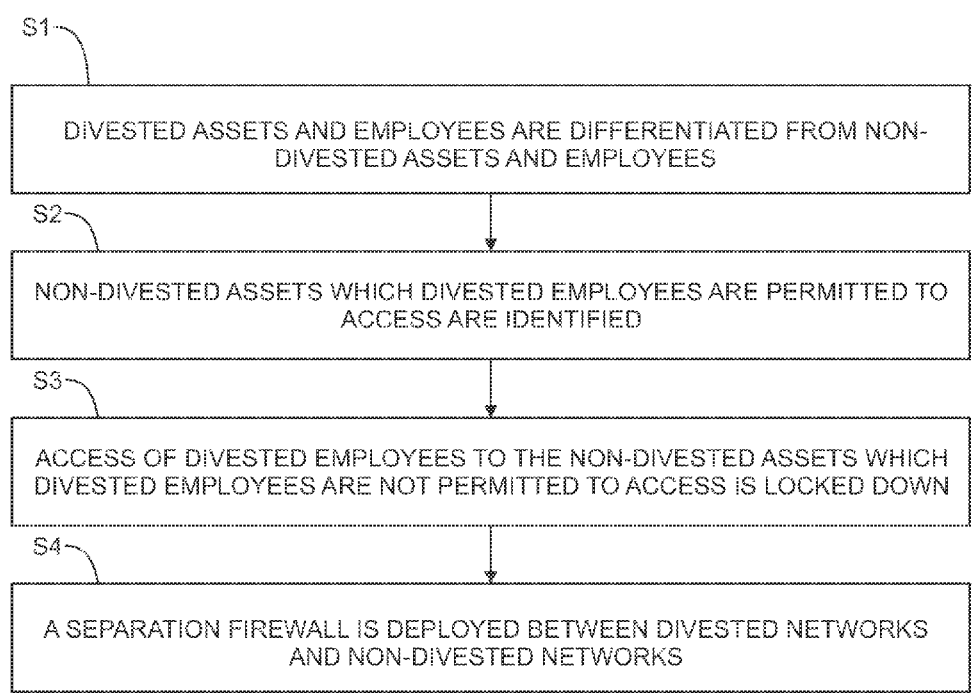
FIG. 8 is a flow chart which illustrates an overview example of the process of securely separating IT assets and personnel of an entity that is divesting some of such assets and personnel from those of an entity that is acquiring the divested assets and personnel for embodiments of the invention.

FIG. 8 is a flow chart which illustrates an overview example of the process of securely separating IT assets and personnel of an entity that is divesting some of such assets and personnel from those of an entity that is acquiring the divested assets and personnel for embodiments of the invention. Referring to FIG. 8, at S1, divested assets and employees may be differentiated from non-divested assets and employees. At S2, non-divested assets which divested employees are permitted to access may be identified. At S3, access of divested employees to the non-divested assets which divested employees are not permitted to access is locked down. At S4, a separation firewall is deployed between divested networks and non-divested networks Referring again to FIG. 2, in the asset migration aspect 248 of migration and cleanup 206 for embodiments of the invention, applications that need to be migrated to the buying entity may first be rebranded 252 to assure that users of the applications are aware that such applications now belong to the buying entity. Rebranding 252 for embodiments of the invention may require, for example, all non-divested logos and proprietary software of the divesting entity to be removed before handover to the buying entity. After rebranding 252, the divesting entity may move the divested applications to the divested part of the network. According to embodiments of the invention, when a divesting entity is a financial institution, all divested IT assets, such as branches and ATM's may be migrated 254 to the buying entity. In addition, data migration 256 may occur in multiple ways that may take the form of an electronic transport via existing network links or via removable media. In either case, the migrated data may be encrypted during transit.

Referring again to FIG. 2, network migration 258 in the asset migration aspect 248 for embodiments of the invention may involve handover of the divested network in each divested location. During network migration 258, network devices may be sanitized to assure that any proprietary information is removed from the device configurations. Also during network migration 258, the buying entity may install its own IT network through a telecommunications provider, and all branch connectivity may be changed from the divesting entity's network 412 as shown in FIG. 4 to the buying entity's network. Once the change is made, a particular branch may communicate with the divesting entity via the divesting entity's external firewall 410 as shown in FIG. 4, if needed.

Referring still again to FIG. 2, once the foregoing process for embodiments of the invention is completed, in a post-TSA cleanup aspect 250 of migration and cleanup 206, the human resources status for each divested worker may be set to HR terminated 260, which removes the divested workers from the divesting entity's HR system and prompts a de-provisioning effect on all access from the divested infrastructure to the divesting entity. Thus, access for divested workers is eliminated for each and every application that such workers may have formerly had in the divesting entity.

Referring also to FIG. 2, in the post-TSA cleanup aspect 250, a voice bulletin service 262 may be implemented on all telephone numbers associated with workers that are now divested. The voice bulletin service 250 may inform callers that a particular divested worker is no longer at the number dialed and/or is no longer part of the divesting entity and may provide the caller a new contact number for the divested worker. Following the TSA period, non-divested asset reclamation 264 may also be implemented in which any non-divested assets that the buying entity may have been permitted to use temporarily may be delivered back to the divesting entity.

It is to be understood that embodiments of the invention may be implemented as processes of a computer program product, each process of which is operable on one or more processors either alone on a single physical platform, such as a personal computer, or across a plurality of platforms, such as a system or network, including networks such as the Internet, an intranet, a Wide Area Network (WAN), a Local Area Network (LAN), a cellular network, or any other suitable network. Embodiments of the invention may employ client devices that may each comprise a computer-readable medium, including but not limited to, Random Access Memory (RAM) coupled to a processor. The processor may execute computer-executable program instructions stored in memory. Such processors may include, but are not limited to, a microprocessor, an Application Specific Integrated Circuit (ASIC), and or state machines. Such processors may comprise, or may be in communication with, media, such as computer-readable media, which stores instructions that, when executed by the processor, cause the processor to perform one or more of the steps described herein.

It is also to be understood that such computer-readable media may include, but are not limited to, electronic, optical, magnetic, RFID, or other storage or transmission device capable of providing a processor with computer-readable instructions. Other examples of suitable media include, but are not limited to, CD-ROM, DVD, magnetic disk, memory chip, ROM, RAM, ASIC, a configured processor, optical media, magnetic media, or any other suitable medium from which a computer processor can read instructions. Embodiments of the invention may employ other forms of such computer-readable media to transmit or carry instructions to a computer, including a router, private or public network, or other transmission device or channel, both wired or wireless. Such instructions may comprise code from any suitable computer programming language including, without limitation, C, C++, C#, Visual Basic, Java, Python, Perl, and JavaScript.

It is to be further understood that client devices that may be employed by embodiments of the invention may also comprise a number of external or internal devices, such as a mouse, a CD-ROM, DVD, keyboard, display, or other input or output devices. In general such client devices may be any suitable type of processor-based platform that is connected to a network and that interacts with one or more application programs and may operate on any suitable operating system. Server devices may also be coupled to the network and, similarly to client devices, such server devices may comprise a processor coupled to a computer-readable medium, such as a RAM. Such server devices, which may be a single computer system, may also be implemented as a network of computer processors. Examples of such server devices are servers, mainframe computers, networked computers, a processor-based device, and similar types of systems and devices.

What is claimed is:

1. A method for managing security during divestiture of assets and employees by a divesting entity, comprising:
    differentiating divested assets of which ownership is transferred from the divesting entity to a buying entity during divestiture and divested employees whose employment is transferred from the divesting entity to the buying entity during divestiture from non-divested assets and employees, wherein differentiating the divested employees further comprises grouping divested employees into an active directory group of divested employees on a human resources database of the divesting entity;
    identifying non-divested assets which divested employees are permitted to access;
    locking down divested employee access to the non-divested assets which divested employees are not permitted to access, wherein locking down divested employee access to the non-divested assets further comprises deploying a divestiture proxy server between divested employees and non-divested assets; and
    deploying a separation firewall between divested networks of which ownership is transferred to a buying entity during divestiture and non-divested networks and between buying entity networks and the non-divested networks.

2. The method of claim 1, wherein differentiating the divested employees further comprises changing status of divested employees from employees of the divesting entity to non-employees of the divesting entity.

3. The method of claim 2, wherein changing the status of divested employees further comprises entering the change on a human resources database of the divesting entity.

4. The method of claim 1, wherein differentiating the divested employees further comprises tagging emails of divested employees.

5. The method of claim 4, wherein tagging the emails of divested employees further comprises entering email tagging logic on a global address database of the divesting entity.

6. The method of claim 1, wherein differentiating the divested employees further comprises providing email disclaimers for divested employees.

7. The method of claim 6, wherein providing the email disclaimers for divested employees further comprises entering email disclaimer logic on a global address database of the divesting entity.

8. The method of claim 1, wherein identifying the non-divested assets which divested employees are permitted to access further comprises generating a whitelist of non-divested assets which the divested employees are permitted to access.

9. The method of claim 8, wherein generating the whitelist of non-divested assets further comprises generating a whitelist of intranet sites of the divesting entity which the divested employees are permitted to access.

10. The method of claim 1, wherein locking down the divested employee access to the non-divested assets further comprises logging divested employee access via the divestiture proxy server to non-divested assets.

11. The method of claim 1, wherein locking down the divested employee access to the non-divested assets further comprises deploying a whitelist filter on the divestiture proxy of non-divested assets which the divested employees are permitted to access.

12. The method of claim 1, wherein locking down divested employee access to the non-divested assets further comprises grouping divested employees into a remote access service group separate from a non-divested employees remote access service group.

13. The method of claim 1, wherein deploying the separation firewall further comprises providing temporary connectivity during a first predetermined period between the divested networks and the non-divested networks via the separation firewall and terminating connectivity between the divested networks and the non-divested networks via the separation firewall upon expiration of the first predetermined period.

14. The method of claim 13, wherein providing temporary connectivity during the first predetermined period further comprises logging traffic between the divested networks and the non-divested networks during the first predetermined period via a separation firewall access logger.

15. The method of claim 1, wherein deploying the separation firewall further comprises providing temporary connectivity during a first predetermined period between buying entity networks and the non-divested networks via the separation firewall and terminating a connectivity between the divested entity networks and the non-divested networks via the separation firewall upon expiration of the first predetermined period.

16. The method of claim 15, wherein providing temporary connectivity during the first predetermined period further comprises logging traffic between the buying entity networks and the non-divested networks during the first predetermined period via the separation firewall access logger.

17. The method of claim 15, wherein deploying the separation firewall further comprises providing temporary connectivity during a second predetermined period between the buying entity networks and the non-divested networks via the separation firewall and terminating the connectivity between the divested networks and the non-divested networks via the separation firewall upon expiration of the first predetermined period.

18. A system for managing asset security during divestiture of assets and employees by a divesting entity, comprising:
a microprocessor coupled to memory, the microprocessor being programmed for:
differentiating divested assets of which ownership is transferred from the divesting entity to a buying entity during divestiture and divested employees whose employment is transferred from the divesting entity to the buying entity during divestiture from non-divested assets and employees, wherein differentiating the divested employees further comprises grouping divested employees into an active directory group of divested employees on a human resources database of the divesting entity;
identifying non-divested assets which divested employees are permitted to access;
locking down divested employee access to the non-divested assets which divested employees are not permitted to access, wherein locking down divested employee access to the non-divested assets further comprises deploying a divestiture proxy server between divested employees and non-divested assets; and
deploying a separation firewall between divested networks of which ownership is transferred to a buying entity during divestiture and non-divested networks and between buying entity networks and the non-divested networks.

19. A method for managing security during divestiture of assets and employees by a divesting entity, comprising:
differentiating divested assets and employees from non-divested assets and employees;
identifying non-divested assets which divested employees are permitted to access;
locking down divested employee access to the non-divested assets which divested employees are not permitted to access;
deploying a separation firewall between divested networks and non-divested networks and between buying entity networks and the non-divested networks; and
providing temporary connectivity between the divested networks and the non-divested networks via the separation firewall during a first predetermined period and between the buying entity networks and the non-divested networks via the separation firewall during a second predetermined period, logging traffic between the divested networks and the non-divested networks via a separation firewall access logger during the first predetermined period and between the buying entity networks and the non-divested networks via the separation firewall access logger during the second predetermined period, and terminating connectivity between the divested networks and the non-divested networks via the separation firewall upon expiration of the first predetermined period and between the buying entity networks and the non-divested networks via the separation firewall upon expiration of the second predetermined period.

* * * * *